US008626056B2

(12) United States Patent
Kim et al.

(10) Patent No.: US 8,626,056 B2
(45) Date of Patent: Jan. 7, 2014

(54) ADJUSTABLE TRANSMITTER FOR PRIVACY PROTECTION OF CONTENT BROADCAST FROM A TRANSMITTING DEVICE TO A RECEIVING DEVICE

(75) Inventors: Yong Jin Kim, San Diego, CA (US); Stephen J. Shellhammer, Ramona, CA (US); Vijayalakshmi R. Raveendran, San Diego, CA (US); Wenyi Zhang, Hefei (CN); Ahmed K. Sadek, San Diego, CA (US); Yu A. Wang, Cerritos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 12/834,342

(22) Filed: Jul. 12, 2010

(65) Prior Publication Data

US 2011/0009049 A1 Jan. 13, 2011

Related U.S. Application Data

(60) Provisional application No. 61/225,189, filed on Jul. 13, 2009.

(51) Int. Cl.
*H04H 20/71* (2008.01)
(52) U.S. Cl.
USPC ....... 455/3.01; 455/522; 455/111; 455/157.2; 455/158.1
(58) Field of Classification Search
USPC .......... 455/3.01, 3.02, 3.03, 3.06, 412.1, 419, 455/420, 464, 41.2, 13.1, 7, 522, 115.1, 455/115.4, 557, 69, 422.1, 561, 412.2, 450, 455/550.1, 414, 455, 111, 157.2, 158.1; 370/220, 254, 401, 503; 705/51; 709/217, 230, 231; 367/77; 725/81, 725/725, 74, 80, 53, 39, 37; 348/552, 723; 607/60, 9, 59, 30

See application file for complete search history.

(56) References Cited

U.S. PATENT DOCUMENTS

| 5,912,917 | A | * | 6/1999 | Engelbrecht et al. ......... 375/131 |
| 6,407,779 | B1 | | 6/2002 | Herz |
| 7,113,099 | B2 | | 9/2006 | Tyroler et al. |
| 7,151,575 | B1 | | 12/2006 | Landry et al. |
| 7,292,588 | B2 | | 11/2007 | Milley et al. |
| 7,826,789 | B2 | * | 11/2010 | Nord ............................. 455/3.01 |
| 8,175,715 | B1 | * | 5/2012 | Cox ................................ 607/60 |

(Continued)

OTHER PUBLICATIONS

International Search Report and Written Opinion -PCT/US2010/041877, International Search Authority—European Patent Office—Oct. 4, 2010.

(Continued)

*Primary Examiner* — Tan Trinh
(74) *Attorney, Agent, or Firm* — Won Tae Kim

(57) ABSTRACT

Transmitting devices facilitate privacy protection of content broadcasted from the transmitting device to a receiving device without the need to modify the receiving device. A transmitting device may be adapted to acquire content, such as audio and/or video data, to be broadcasted by the transmitter for reception and use by a receiving device. A transmission range is selected to define a distance for broadcasting the content from the transmission device for reception and use by a receiving device. A frequency is also selected to be used for broadcasting the content. With the transmission range and frequency selected, the transmitting device may broadcast the content according to the selected transmission range and frequency.

27 Claims, 4 Drawing Sheets

(56) References Cited

U.S. PATENT DOCUMENTS

| | | | |
|---|---|---|---|
| 2002/0081972 A1* | 6/2002 | Rankin | 455/41 |
| 2003/0088295 A1* | 5/2003 | Cox | 607/60 |
| 2003/0120742 A1* | 6/2003 | Ohgami et al. | 709/217 |
| 2004/0078336 A1* | 4/2004 | Asadu | 705/51 |
| 2005/0174488 A1* | 8/2005 | Chennakeshu | 348/552 |
| 2006/0023626 A1* | 2/2006 | Krausz | 370/220 |
| 2006/0190972 A1* | 8/2006 | Kasamatsu et al. | 725/81 |
| 2008/0166963 A1* | 7/2008 | Nord | 455/3.05 |
| 2009/0074183 A1* | 3/2009 | Asadu | 380/44 |
| 2009/0215402 A1* | 8/2009 | Ng | 455/69 |
| 2009/0222863 A1* | 9/2009 | Lin | 725/81 |
| 2009/0262661 A1* | 10/2009 | Ueda et al. | 370/254 |
| 2009/0270025 A1* | 10/2009 | Kossi et al. | 455/3.01 |
| 2010/0112998 A1* | 5/2010 | Choudhury et al. | 455/422.1 |
| 2012/0275269 A1* | 11/2012 | Ray | 367/77 |

OTHER PUBLICATIONS

Manuel Roman, Nayeem Islam, and Shahid Shoaib, "A Wireless Web For Creating And Sharing Personal Content Through Handsets" PERVASIVE computing, IEEE , 2005 Published by the IEEE CS and IEEE ComSoc, pp. 67-73.

Taiwan Search Report—TW099123007—TIPO—Apr. 26, 2013.

* cited by examiner

ADJUSTABLE TRANSMITTER FOR PRIVACY PROTECTION OF CONTENT BROADCAST FROM A TRANSMITTING DEVICE TO A RECEIVING DEVICE

CLAIM OF PRIORITY UNDER 35 U.S.C. §119

The present application for patent claims priority to Provisional Application No. 61/225,189 entitled "Adjustable Transmitter for Privacy Protection in White Space" filed Jul. 13, 2009 and assigned to the assignee hereof and hereby expressly incorporated by reference herein.

BACKGROUND

1. Field

Various features disclosed herein relate to wireless content delivery, and at least some features pertain to devices and methods for facilitating the secure broadcast of content from a content transmitting device and a receiving device without the need to modify the receiving device to provide privacy protection.

2. Background

ATSC (Advanced Television Systems Committee) is a set of standards developed by the Advanced Television Systems Committee for digital television transmission that replaced much of the analog NTSC television system. An ATSC tuner, often called an ATSC receiver or high-definition television (HDTV) tuner, allows reception of ATSC digital television (DTV) signals broadcast over-the-air by TV stations. Such tuners may be integrated into televisions, VCRs, digital video recorders, and/or set-top boxes which provide audio/video output-connectors of various types. An ATSC tuner for most cable TV systems is a quadrature amplitude modulation (QAM) tuner, referring to the different type of modulation used.

Data stored on a transmitter may be securely transmitted or broadcasted to a receiver (e.g., high-definition television (HDTV) by encrypting the data transmitted between the transmitter and the receiver. However, in order to facilitate data encryption, some receivers (e.g., high-definition televisions) may require modifications to enable the necessary decryption functionality. Modifying existing receivers may be impractical and highly costly.

Therefore, a system and method are needed that provide for the secure transmission of content (e.g., audio and/or video) using existing, unmodified receivers. In other words, receivers that do not have to be modified with decryption functionality or any other type of functionality to facilitate secure content transmissions.

SUMMARY

According to a feature, protected transmissions of content from a transmitter to a receiver are facilitated by providing a transmitter capable of adjusting a transmission range to define a distance for broadcasting the content for reception and use by a receiving device.

One feature provides an access terminal for facilitating protected transmissions of content to a receiving device. The access terminal may include a transmitter module to broadcast content for use by a receiving device. A processing circuit may be coupled to the transmitter module to receive a transmission parameter and select a transmission range in response to the received transmission parameter. The processing circuit may be further adapted to select a frequency on which to broadcast the content. The processing circuit may then broadcast the content according to the selected transmission range and the selected frequency.

A method operational on an access terminal is also provided according to one feature for facilitating protected transmissions of content from the access terminal to a receiving device. For instance, the access terminal may acquire content, such as audio and/or video content, to be broadcasted. A transmission range may be selected for broadcasting the content in a manner to be both received and used by a receiving device. Furthermore, a frequency may be selected on which to broadcast the content. With the transmission range and the frequency selected, the content may be broadcast from the access terminal according to the selected transmission range and the selected frequency.

Another feature provides an access terminal for facilitating protected transmissions of content to a receiving device, which access terminal may include means for acquiring content to be broadcasted. The access terminal may further include means for selecting a transmission range for broadcasting the content for reception and use by a receiving device, and means for selecting a frequency on which to broadcast the content. Means for broadcasting the content from the access terminal according to the selected transmission range and the selected frequency may also be included.

Yet another feature provides a machine-readable medium that includes instructions for facilitating protected transmission of content from an access terminal for use by a receiving device. When executed by a processor, the instructions may cause the processor to receive a transmission parameter, select a transmission range in response to the received transmission parameter, select a frequency on which to broadcast the content, and broadcast the content according to the selected transmission range and the selected frequency.

DETAILED DESCRIPTION

Figure 1:
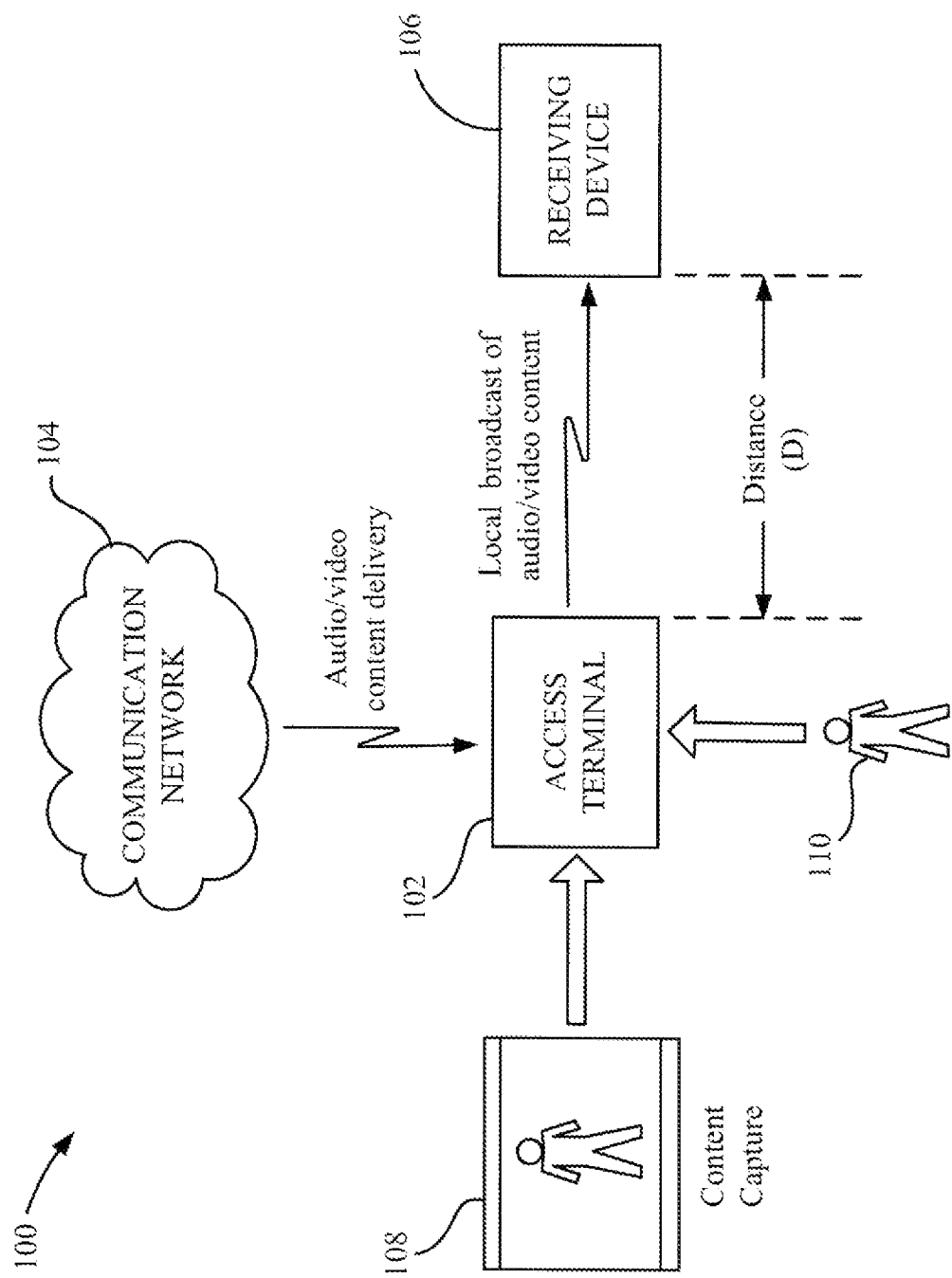
FIG. 1 is a block diagram illustrating at least one example of how one or more access terminals may operate within a communication system.

In the following description, specific details are given to provide a thorough understanding of the described implementations. However, it will be understood by one of ordinary skill in the art that various implementations may be practiced without these specific details. For example, circuits may be shown in block diagrams in order not to obscure the implementations in unnecessary detail. In other instances, well-known circuits, structures and techniques may be shown in detail in order not to obscure the described implementations.

In the following description, certain terminology is used to describe certain features. For example, the term "access terminal" includes, but is not limited to, wireless devices such as mobile phones, wireless phones, mobile communication devices, personal digital assistants, mobile palm-held computers, laptop computers, and/or other types of mobile devices typically carried by individuals and/or having some form of communication capabilities (e.g., wireless, infrared, short-range radio, etc.). The term "receiving device" includes, but is not limited to, viewing devices (e.g., high definition televisions, display monitors, computers, and/or any other type of device capable of receiving and displaying video and/or audio content (or data)), as well as audio devices (e.g., stereos, radios, computers, and/or any other type of device capable of receiving and broadcasting (i.e., playing) audio content (or data)). Furthermore, the word "exemplary" is used herein to mean "serving as an example, instance, or illustration." Any implementation or embodiment described herein as "exemplary" is not necessarily to be construed as preferred or advantageous over other implementations or embodiments.

Overview

In delivering audio and/or video content over the air to a receiving device, it is sometimes desirable to protect such content so that only intended recipients can receive and use the content. In some instances, it may be desirable to transmit the audio and/or video content locally from an access terminal (e.g., wireless mobile user device) to a nearby receiving device. In these situations, it desirable to provide privacy and prevent unauthorized and/or unintentional reception of audio and/or video content signals by stray or nearby receiving devices.

One feature provides a transmitter or access terminal (herein used interchangeably) including an adjustable transmission range. The transmission range of the transmitter may be limited to prevent unintended receiving devices from receiving broadcasted audio and/or video content from the transmitter. Such privacy protection as described herein may enable existing receiving devices to receive audio and/or video content or data, while preventing unauthorized reception of the content by an unintended receiving device.

According to one example, an access terminal may adjust its transmission range to a minimal distance and/or power such that the transmission of the audio and/or video content beyond the transmission range (e.g., to unintended receiving devices) may be prevented. The transmission range may be specified by a user entering a specific transmission parameter, such as a specific distance (e.g., three (3) feet) or adjusting a range/quality indicator on an adjustment bar. The minimal distance may be defined as the distance between the access terminal and the receiving device.

According to at least one feature, the user may adjust the transmission range based on the quality of the content at the receiving device. For example, the user can increase or decrease the transmission range while hearing/observing the content quality on the receiving device. If the quality of the content is not sufficient, the transmission range may be adjusted until the quality is sufficient. Conversely, if the content quality is sufficient or adequate, the user may further minimize the transmission range or may maintain the current transmission range.

Communication System

FIG. 1 is a block diagram illustrating at least one example of how one or more access terminals may operate within a communication system. The communication system 100, as illustrated, includes an access terminal 102, a communication network 104, and a receiving device 106. The communication network 104 may comprise a wireless wide-area network (WWAN), a wireless local-area network (WLAN), as well as a combination thereof. The access terminal 102 may access the communication network 104 wirelessly via an access node (e.g., base station of a WWAN) which may be part of the communication network 104. In the example illustrated in FIG. 1, the access terminal 102 may be adapted to receive content, such as audio and/or video content (e.g., in digital and/or analog format) via the communication network 104 (e.g., from a content provider or broadcaster). In one example, the content received from the communication network 104 may be stored on the access terminal 102 for later transmission (e.g., retransmission or broadcasting) to one or more receiving devices 106. According to another feature, the access terminal 102 may additionally or alternatively be adapted to directly capture the content 108 using one or more content capturing modules (e.g., a camera, a video camera, an audio recorder). According to yet another feature, the access terminal 102 may additionally or alternatively be adapted to receive or obtain the content locally (e.g., from a user 110) using, for example, a storage medium (e.g., disk, flash memory data storage device, such as a Universal Serial Bus (USB) drive), or any other external storage device capable of storing and transferring content to an access terminal. According to still another feature, the access terminal 102 may be adapted to generate the content locally using, for example, a processing circuit.

In many instances, the access terminal 102 may have a small or limited display or limited playback capabilities, making playback of audio and/or video content less than optimal or convenient. Additionally, in various cases, the access terminal 102 may or may not be adapted for audio and/or video playback. In either case, the access terminal 102 may be adapted to transmit or broadcast the audio and/or video content to a separate receiving device 106 for viewing and/or listening in real time, as well as for recording when applicable. Such transmission or broadcast from the access terminal 102 to the receiving device(s) 106 may be short range or local (e.g., within a room, within a distance of 0 to 5 feet, within a distance of 16 feet, within a distance of 32 feet, within a distance of 50 feet, within a distance of 100 feet, within a particular transmission power level, etc.).

The receiving device 106 may accordingly include playback and/or recording features adapted for playing, storing, and/or recording content received from the access terminal 102. In such scenarios, the access terminal 102 may act as a relay or source of the audio and/or video content for watching and/or listening to the content on the receiving device 106. Broadcasting the audio and/or video content from the access terminal 102 to the receiving device 106 can be more convenient than doing a point-to-point transmission, since minimal or no setup of communications may be needed between the access terminal 102 and the receiving device 106. For instance, the receiving device 106 may simply be tuned to the correct frequency channel in order to capture and display the audio and/or video content being transmitted or broadcasted by the access terminal 102.

According to one feature, the audio and/or video content may be transmitted from the access terminal 102 to the viewing device 106 using white space (also referred to as whitespace). "White space" may refer to radio frequencies allocated to a broadcasting service but not used locally (e.g., short range). The Federal Communication Commission (FCC) Report and Order (R&O) recently opened up an opportunity of unlicensed usage of the white space. Accordingly, white space may be used for various purposes including the transmission of audio and video (AV) content from portable/mobile multimedia content sources such as an access terminal to nearby receivers (e.g., HD television (HDTV)). Additionally, other unlicensed frequency space or bands may be used for the transmission or broadcast of content by the access terminal 102.

According to one feature, ATSC signals may be used in transmission or broadcast of the content by the access terminal 102. ATSC is a set of standards developed by the Advanced Television Systems Committee for digital television transmission that replaced the analog television system in the United States. As ATSC signals may be used in the existing, unmodified receiving device 106 (e.g., HDTV), the receiving device 106 may be used to receive content from an access terminal 102. In other words, the receiving device 106 (e.g., HDTV) need not be modified with additional functionality to decode content received from the transmitter (i.e., access terminal 102). As noted above, the user may merely tune the receiving device (e.g., HDTV) to a frequency channel on which the content is being transmitted or broadcasted.

Because the receiving device 106 need not be modified with additional functionality to decode the content received from the access terminal 102, any conventional receiving device 106 may view and/or listen to the broadcasted content, including unintended receivers. For example, a user of the access terminal 102 may want to view a private video clip (e.g., stored, acquired or generated by the wireless device 102) on the receiving device 106, but does not want a nearby unintended receiver to obtain or playback the video clip. To prevent an unintended recipient from viewing the unprotected broadcast of the private video clip, the access terminal 102 is adapted to enable a user to limit the transmission range of the content transmission or broadcast signal. Consequently, unintended recipients (e.g., other receiving devices) that are located beyond the transmission or broadcast range will not be able to view the private video clip even if they are tuned to the correct transmission or broadcast channel.

For instance, the user may limit the transmission or broadcast to a specific distance D that is sufficient to reach the receiving device 106 without extending beyond the receiving device 106 to unintended receiving devices. For example, the user may limit the transmission range to within five feet, ten feet, twenty feet, thirty feet, etc. Therefore, receiving devices beyond the ten-foot transmission range will not be able to receive and/or playback the transmitted or broadcasted content. Although the transmission range may be referred to herein with relation to distance, it is important to note that the transmission range is not solely dependent on the distance. For example, in addition to the distance between the access terminal 102 and the receiving device 106, the transmission range may depend on the transmission frequency used to transmit or broadcast the content, the terrain between the access terminal 102 and the receiving device 106 (e.g., number of walls/barriers), or any other variable that may affect the transmission signal, as well as combinations thereof.

Figure 2:
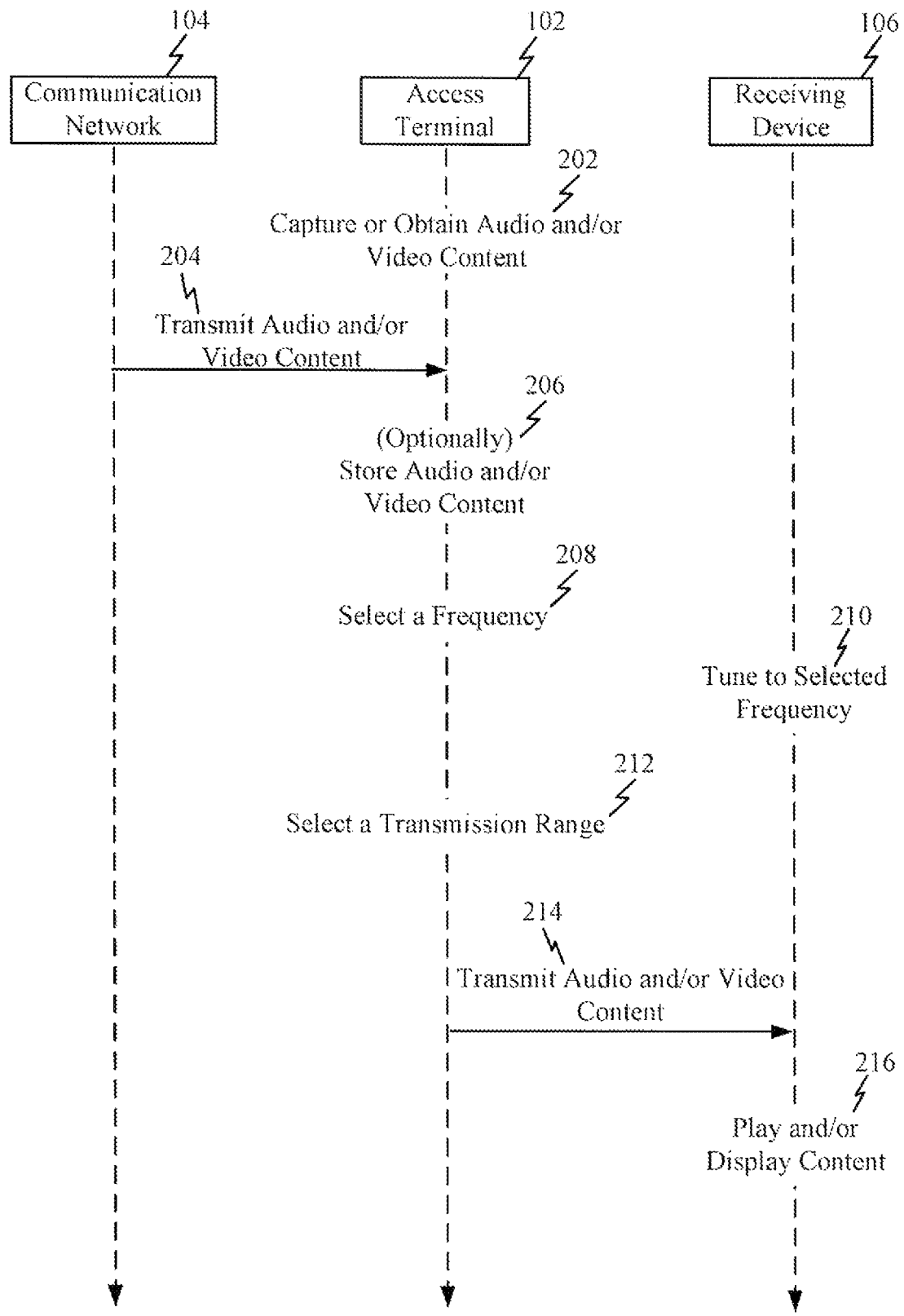
FIG. 2 is a flow diagram illustrating an example of protecting a wireless transmission of content between an access terminal and a receiving device.

Exemplary Protected Transmission Between an Access Terminal and a Receiving Device FIG. 2 is a flow diagram illustrating an example of protecting a wireless transmission of content between an access terminal and a receiving device. In this example, the access terminal 102, communication network 104 and receiving device 106 of FIG. 1 are used for illustration purposes. As part of a secure transmission of content from the access terminal 102 to the receiving device 106, the access terminal 102 may acquire the audio and/or video content to be transmitted. For example, the access terminal 102 may generate the content at the access terminal 102, may capture the content directly to the access terminal 102 using one or more content capturing modules (e.g., camera, video camera, audio recorder) and/or may obtain the content from an external or internal storage device (e.g., disk, flash memory data storage device, such as a Universal Serial Bus (USB) drive) 202. The access terminal 102 may additionally or alternatively receive the content from a transmission 204 from the communication network 104.

After the access terminal 102 has acquired the audio and/or video content, the access terminal 102 may (optionally) store the content locally in some storage medium accessible by the access terminal 102, such as an internal memory 206. Alternatively, the audio and/or video content may remain stored in an external storage medium, such as a USB drive, and the access terminal 102 may transmit the content from the external storage medium to the receiving device 106.

A frequency may also be selected on which to transmit the content 208. The access terminal 102 may be adapted or configured to transmit the content (e.g., in analog or digital format) using a frequency or frequency band associated with a specific channel on which the receiving device 106 expects to receive content. For example, the frequency may correspond to a particular television channel or radio station. As described above, the frequency may be in white space (e.g., a licensed, but unused frequency space) or an unlicensed frequency space. In some cases where the selected frequency or channel has been allocated to others, the transmission and/or broadcast of content by the access terminal on that frequency or channel may encounter interference or noise. However, because the access terminal 102 is broadcasting locally (e.g., short range), the local transmission or broadcast for at least some implementations will be significantly stronger (e.g., have stronger signal power) than other signals on the same frequency or channel. Consequently, the intended receiving device 106 will be able to correctly capture the content transmission or broadcast from the access terminal 102 even when other signals are present in the same frequency or channel. The receiving device 106 may also be tuned 210 to the selected frequency for receiving the audio and/or video content. In some implementations, if the user perceives degradation of the content being transmitted to, and displayed by, the receiving device 106 (e.g., due to interference from transmissions on the same or overlapping frequency) the user may adjust the transmission frequency of the access terminal 102 and/or receiving frequency of the receiving device 106.

A user may select a transmission range from a plurality of transmission ranges 212. The selected transmission range defines at least a substantially maximum distance to which a signal including the content may be transmitted or broadcasted with enough power to be usable by a receiving device. In order to protect the content from reception and use by an unintended receiving device, the user may select a transmission/broadcast range that will transmit the content a distance that is sufficient to reach the intended receiving device 106, while preventing transmission/broadcast of the content at a distance that will potentially reach unintended receiving devices. Consequently, any content transmitted by the access terminal 102 may not be transmitted beyond the specified transmission range. That is, the transmission power of a transmitter in the access terminal 102 may be throttled to limit its range. In some implementations, transmission power of the access terminal 102 may be dynamically adjusted by adjusting a transmitter within the access terminal 102.

The transmission range may be selected by a user inputting (e.g., manually) some transmission parameter at the access terminal 102. In one example, the transmission range may be selected by the user entering into the access terminal 102 a specific distance value, for example three (3) feet, to limit the transmission range to the specified distance value.

In another example, the user may select the transmission range by adjusting a range/quality indicator on an adjustment bar (e.g., an index into the adjustment bar). The adjustment bar may be related to the distance and/or quality of content transmission and/or broadcast, and the indicator (e.g., a darkened or lightened portion of the adjustment bar, an arrow, etc.)

on the adjustment bar may indicate the distance or content playback quality. By utilizing keys or a touch screen on the access terminal 102, the user can adjust the position of the indicator on the adjustment bar to select a desired transmission range/quality. By way of example and not limitation, such an adjustment bar may be adapted to increase the transmission range when the indicator of the adjustment bar is moved rightward or upward. Conversely, when the indicator of the adjustment bar is moved in the opposite direction (leftward or downward), the transmission range may decrease. The adjusted transmission range may be stored in the wireless device automatically.

As the user is adjusting the transmission range using the adjustment bar, the picture and/or sound on the receiving device 106 may be observed and/or listened to for quality. That is, the user can increase or decrease the transmission range using the adjustable bar and may visually and/or audibly determine if the picture and/or sound quality on the receiving device 106 is acceptable. If the quality of the picture and/or sound is acceptable, the user may accept the transmission range. Consequently, the user can achieve satisfactory picture and/or sound quality while minimizing the transmission range to a distance sufficient to reach only the intended receiving device 106.

According to one feature, the transmission range may be selected, in addition to or in alternative to a user input, by a processing circuit on the access terminal 102. For example, a processing circuit may be adapted (e.g., programmed) to select a transmission range in response to a measurement of noise/interference levels or other frequency conditions.

The audio and/or video content is then transmitted 214 from the access terminal 102 to the receiving device 106. The receiving device 106 receives the audio and/or video content and plays and/or displays the content for the user 216. Note that the transmission range may be dynamically adjusted (e.g., as portions of the content is being transmitted or broadcasted) by the access terminal 102.

Exemplary Access Terminal

Figure 3:
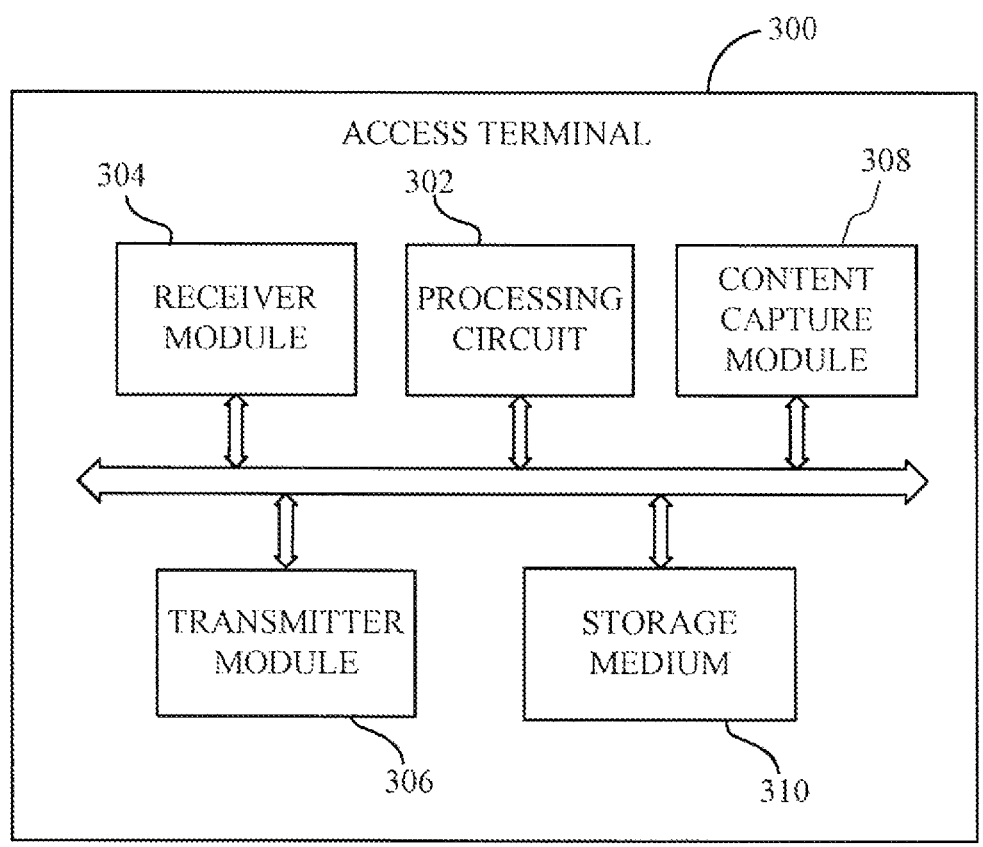
FIG. 3 illustrates a block diagram showing selected components of an access terminal according to one example.

FIG. 3 illustrates a block diagram showing selected components of an access terminal according to one example. The access terminal 300 may include a processing circuit 302 coupled to a transmitter module 306, and optionally to a receiver module 304. The optional receiver module 304 may be adapted to receive data from a communication network (e.g. communication network 104 of FIG. 1). According to one feature, the data received from the communication network via the receiver module 304 may include the audio and/or video content described herein. The transmitter module 306 may be adapted to broadcast content for reception and use by a receiving device. For example, the transmitter module 306 may be configurable or arranged to allow transmission or broadcast of the content over a frequency space or channel (e.g., as defined by ATSC). According to a feature, the transmitter module 306 may be adapted to broadcast over white space or other unlicensed frequency space or bands. The transmitter module 306, in at least some implementations, may further be adapted to communicate data to the communication network. In such implementations, the receiver module 304 and the transmitter module 306 may form at least a portion of a transmit chain and/or receive chain that operates to transmit and/or receive one or more concurrent or serial data streams to and/or from the access terminal 300.

The processing circuit 302 may be adapted (e.g., programmed) to receive a transmission parameter and to select a transmission range in response to the received transmission parameter. The transmission parameter may be input by a user (e.g., manually input). As noted above, the transmission parameter may include a distance value, an index into an adjustment bar (e.g., a location of an indicator on the adjustment bar), and/or a power value. The transmission parameter may be selected by the user based on a perceived quality of the content at the receiving device.

The transmission range may be selected to be sufficient to reach the intended receiving device while preventing receiving devices located beyond the transmission range from receiving and using the broadcasted content. It is noteworthy that the content may be broadcast beyond the selected transmission range, but it is intended that any such signals would be of such a strength as to be at least substantially unusable by a conventional receiving device. That is, a conventional receiving device would be unable to play and/or display the content in a meaningful way to enable a user to listen to and/or view the content. Selecting the transmission range may, therefore, require consideration of a number of variables, including a distance between the access terminal and the intended receiving device, the transmission frequency used to transmit or broadcast the content, the terrain between the access terminal and the receiving device (e.g., number of walls/barriers), and/or other variables that may affect the transmission signal. According to at least one implementation, the processing circuit 302 may execute programming causing the processing circuit 302 to set the transmission power in response to the transmission parameter.

The processing circuit 302 may further be adapted (e.g., programmed) to select a frequency on which to broadcast the content and to subsequently broadcast the content according to the selected transmission range and selected frequency. According to some implementations, the frequency may be a fixed frequency used for all transmissions or broadcasts of the content by the access terminal 300. According to other implementations, a plurality of frequencies may be selectable by the processing circuit 302 for use in broadcasting the content. For example, the processing circuit 302 may execute programming causing the processing circuit 302 to identify an available frequency and set the transmitter module 306 to transmit on that frequency. According to another example, a user may select a frequency using an user interface, and the processing circuit 302 may select the frequency based on the input from the user.

According to one feature, the processing circuit 302 may further be adapted (e.g., programmed) to acquire the content, such as audio and/or video content. As noted above, the processing circuit 302 may acquire the content by receiving the content from a communication network via the receiver module 304. The processing circuit 302 may also or alternatively be coupled to an optional content capture module 308 and the processing circuit 302 may be adapted to acquire the content via the content capture module 308. By way of example and not limitation, the content capture module 308 may include one or more of a camera, a video camera, an audio recorder and/or an external storage device, as noted herein above with reference to FIGS. 1 and 2. According to one feature, the processing circuit 302 may generate the content.

The processing circuit 302 may further be coupled to a storage medium 310. The processing circuit 302 may be adapted to store content at the storage medium 310 and may acquire the content from the storage medium. For example, the processing circuit may store content acquired via the receiver module 304, the content capture module 308, and/or generated by the processing circuit 302 at the storage medium 310. According to a feature, such content may include digital high-definition audio and/or video content that is usable by a high-definition receiving device.

Figure 4:
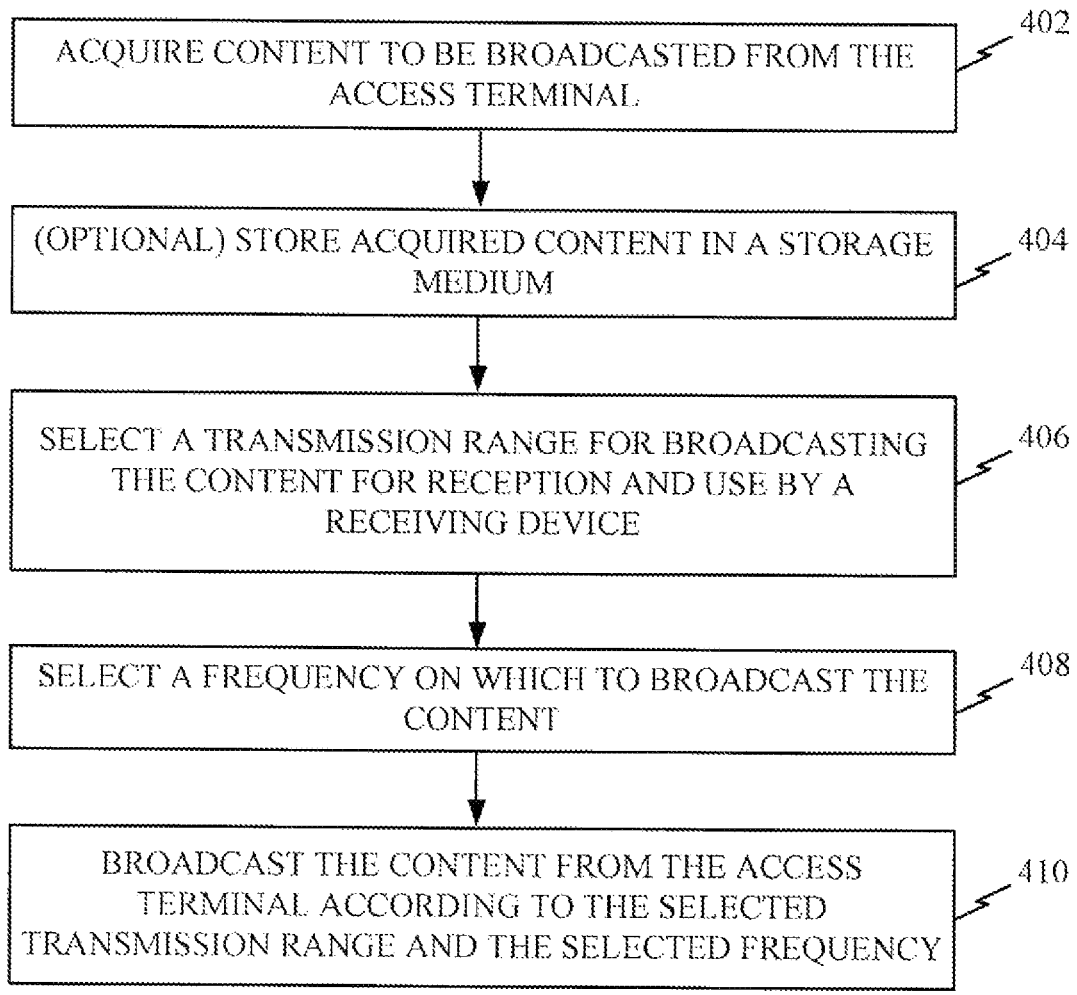
FIG. 4 is a flow diagram illustrating a method operational at an access terminal for providing privacy protection to content transmissions between the access terminal and a receiving device.

FIG. 4 is a flow diagram illustrating a method operational at an access terminal for providing privacy protection to content transmissions between the access terminal and a receiving device. Initially, the access terminal may acquire content, such as audio and/or video content, to be broadcasted by the access terminal 402. As noted above, the access terminal may acquire the content by receiving the content wirelessly from a communication network, via a content capture module, generating the content with a processing circuit on the access terminal and/or obtaining the content from a storage medium on the access terminal. According to some implementations, the acquired content may be stored in a storage medium 404. Alternatively, the content may be transmitted to a receiving device for use in real-time. For example, the access terminal may act as a relay for playing and/or displaying audio and/or video content on an external receiving device.

A transmission range may be selected for broadcasting the content for reception and use by a receiving device 406. The transmission range may define a distance for broadcasting the content for reception and use by a receiving device. As noted above, the content may be broadcast beyond the defined distance, but it is intended that any such signals would be of such a strength and/or quality as to be at least substantially unusable by a conventional receiving device. That is, the signal beyond the defined distance would be of such strength and/or quality that a conventional receiving device located beyond the defined distance would be unable to play and/or display the content in a meaningful way for a user to listen to and/or view the content. For the signal to be both received and used by a receiving device, the transmission range may require consideration of a number of variables, including a distance between the access terminal and the intended receiving device, the transmission frequency used to transmit or broadcast the content, the terrain between the access terminal and the receiving device (e.g., number of walls/barriers), and/or other variables that may affect the transmission signal.

The transmission range, as noted herein, may be selected in response to a user input, (e.g., a distance value, an adjustable index into an adjustment bar), a power value, etc. A user may select the transmission range such that it is sufficient to reach an intended receiving device while preventing a receiving device beyond the defined distance (e.g., at a distance farther than the transmission range) from receiving and using the broadcasted content. Such a transmission range may be selected by a user based on a perceived quality of the content at the intended receiving device. For example, the user may adjust the transmission range until a desired transmission range is achieved. That is, the user may, for example, increase the transmission range if the perceived quality is insufficient and/or decrease the transmission range if the perceived quality is sufficient. The user may also maintain the transmission range when the transmission range is at a minimum value for providing a perceived quality that is sufficient.

A frequency or channel may be selected for broadcasting the content 408. In one example, the selected frequency or channel may be in white space (e.g., a frequency space or range that is allocated for another use). In another example, the selected frequency or channel may be in a frequency space or range that is unallocated for a particular use. The content may then be broadcasted from the access terminal according to the selected transmission range and the selected frequency 410.

By utilizing the features described above, transmission range of private content can be adjusted by a user to prevent private information from leaking beyond a minimal transmission range. Additionally, existing receiving devices, such as high-definition televisions, may be used without any modifications, thus increasing the usability of many different types of receiving devices.

One or more of the components, steps, features and/or functions illustrated in FIGS. 1, 2, 3, and/or 4 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1 and/or 3 may be configured to perform one or more of the methods, features, or steps described in FIGS. 2, and/or 4. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a non-transitory storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also, be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An access terminal, comprising:
   a transmitter module to broadcast content for use by a receiving device; and
   a processing circuit coupled to the transmitter module, the processing circuit adapted to:
      receive a transmission range input by a user, wherein the received transmission range comprises at least one transmission range selected from a group of transmission ranges comprising a transmission power value, a distance value, and an index into an adjustment bar;
      select a frequency on which to broadcast the content; and
      broadcast the content according to the received transmission range and the selected frequency.

2. The access terminal of claim 1, wherein the processing circuit is further adapted to acquire the content.

3. The access terminal of claim 2, wherein the processing circuit is adapted to acquire the content from a storage medium coupled to the processing circuit.

4. The access terminal of claim 2, further comprising a receiver module coupled to the processing circuit, wherein the processing circuit is adapted to:
   receive the content from the communication network via the receiver module; and
   store the content in a storage medium.

5. The access terminal of claim 2, further comprising a content capture module coupled to the processing circuit, wherein the processing circuit is further adapted to acquire the content via the content capture module.

6. The access terminal of claim 5, wherein the content capture module comprises at least one of a camera and/or a video camera and/or an audio recorder and/or an external storage device.

7. The access terminal of claim 1, wherein the received transmission range comprises a transmission range input by a user based on a perceived quality of the content at a receiving device.

8. The access terminal of claim 1, wherein the processing circuit is adapted to select the frequency on which to broadcast the content from a frequency space that is one of unallocated or in white space.

9. The access terminal of claim 1, wherein the content includes at least one of audio and/or video data.

10. The access terminal of claim 9, wherein the broadcasted content comprises digital high-definition content for use by a high-definition receiving device.

11. The access terminal of claim 1, wherein the received transmission range input by a user comprises a transmission range sufficient to reach an intended receiving device and to prevent a receiving device located at a distance farther than the transmission range from using the broadcasted content.

12. A method operational at an access terminal for transmitting content for reception by a receiving device, comprising:
   acquiring content to be broadcasted;
   receiving a user selected transmission range for broadcasting the content for reception and use by a receiving device, wherein the user selected transmission range comprises at least one user selected transmission range from a group of user selected transmission ranges comprising a transmission power value, a distance value, and an adjusted index on an adjustment bar;
   selecting a frequency on which to broadcast the content; and
   broadcasting the content from the access terminal according to the selected transmission range and the received frequency.

13. The method of claim 12, wherein acquiring the content comprises receiving the content from a storage medium on the access terminal.

14. The method of claim 12, wherein acquiring the content includes generating the content with a processor on the access terminal.

15. The method of claim 12, wherein acquiring the content comprises:
   receiving the content wirelessly from a communication network; and
   storing the content in a storage medium.

16. The method of claim 12, wherein acquiring the content comprises acquiring at least one of audio and/or video data via a content capture module.

17. The method of claim 16, wherein acquiring the content via the content capture module comprises acquiring the content via at least one of a camera and/or a video camera and/or an audio recorder and/or an external storage device.

18. The method of claim 12, wherein receiving a user selected transmission range further comprises receiving the user selected transmission range based on a perceived quality of the content at a receiving device.

19. The method of claim 18, wherein receiving the user selected transmission range based on the perceived quality of the content at a receiving device includes:
   receiving an increased transmission range if the perceived quality is insufficient;
   receiving a decreased transmission range if the perceived quality is sufficient; and
   maintaining the transmission range when the transmission range is at a minimum value for providing a perceived quality that is sufficient.

20. The method of claim 12, wherein receiving the user selected transmission range includes receiving a transmission range selected by a user to be sufficient to reach an intended receiving device while preventing a receiving device located outside of the transmission range from receiving and using the broadcasted content.

21. The method of claim 12, wherein selecting the frequency on which to broadcast the content comprises selecting a frequency from a frequency space that is one of unallocated or in white space.

22. The method of claim 12, wherein broadcasting the content includes broadcasting digital high-definition content adapted for use by a high-definition receiving device.

23. An access terminal, comprising:
means for acquiring content to be broadcasted;
means for receiving a user selected transmission range for broadcasting the content for reception and use by a receiving device, wherein the user selected transmission range comprises at least one user selected transmission range from a group of user selected transmission ranges comprising a transmission power value, a distance value, and an adjusted index on an adjustment bar;
means for selecting a frequency on which to broadcast the content; and
means for broadcasting the content from the access terminal according to the received transmission range and the selected frequency.

24. The access terminal of claim 23, wherein the means for acquiring the content includes:
means for receiving the content wirelessly from a communication network; and
means for storing the content in an internal storage medium.

25. The access terminal of claim 23, wherein the means for selecting the frequency on which to broadcast the content comprises means for selecting a frequency from a frequency space that is one of unallocated or in white space.

26. A machine-readable medium comprising instructions for facilitating protected transmission of content from an access terminal for use by a receiving device, which when executed by a processor causes the processor to:
receive a transmission range input by a user, wherein the received transmission range comprises at least one user input selected from a group of user inputs comprising a distance value, an adjusted index on an adjustment bar, and a power value;
select a frequency on which to broadcast the content; and
broadcast the content according to the selected transmission range and the selected frequency.

27. The machine-readable medium of claim 26, further comprising instructions, which when executed by a processor causes the processor to acquire the content via at least one of a receiver module in communication with a communication network and/or a content capture module and/or a storage medium.

* * * * *